April 11, 1939.   M. BIRKIGT   2,154,319
SPEED-REDUCTION GEAR
Filed Aug. 6, 1936
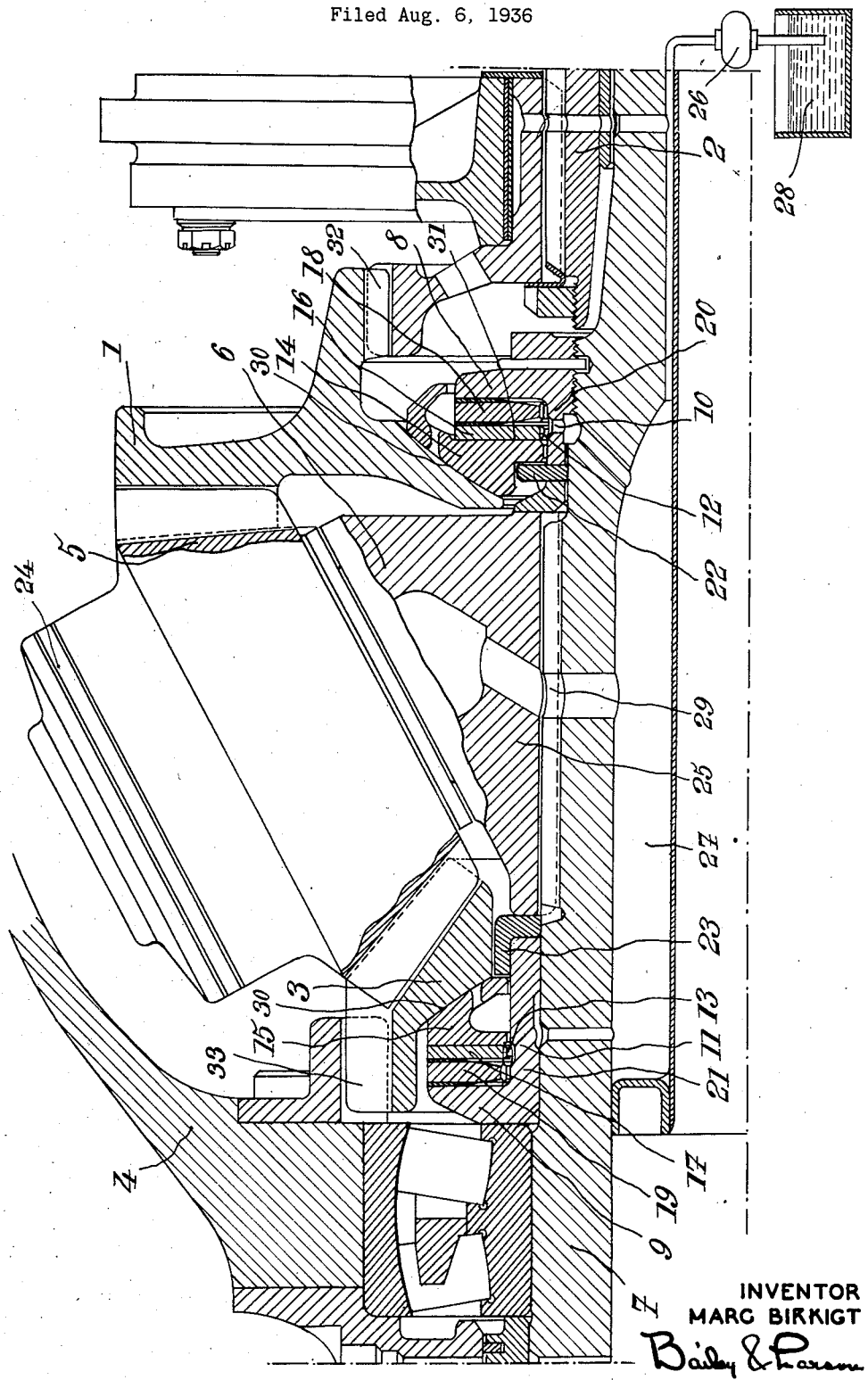
INVENTOR
MARC BIRKIGT
Bailey & Parson
ATTORNEYS Patented Apr. 11, 1939

2,154,319

UNITED STATES PATENT OFFICE 2,154,319

SPEED-REDUCTION GEAR

Marc Birkigt, Bois-Colombes, France

Application August 6, 1936, Serial No. 94,691
In Belgium February 2, 1936

3 Claims. (Cl. 184—6)

This invention relates to speed-reduction gears, and, more particularly to such gears of the planetary or epicyclic type, such as, for example, those used in connection with aircraft engines.

The main purpose of my invention is to improve the lubrication of the axial thrust bearings incorporated in such speed-reduction gears, said thrust bearings having heretofore been a source of operating trouble owing to defective lubrication.

The principal object of my invention is to provide an improved type of planetary speed-reduction gear in which the axial thrust bearings are lubricated under high pressure, said pressure being produced by the insertion, in the oil-return passages from said thrust bearings, of means for throttling the oil flow to an extent sufficient to build up the required oil pressure in said thrust bearings.

Another object of my invention is to provide an improved type of planetary speed-reduction gear as above, in which the oil return passages from said thrust bearings comprise sections of reduced cross-sectional area, said cross-sectional area being such as to offer sufficient resistance to the flow of oil to build up the required oil pressure within said thrust bearings.

A further object of my invention is to provide an improved reduction gear as above, in which partially obstructing members are placed in the oil-return passages from said thrust bearings, said partially obstructing members being designed so as to constrict said oil-return passages to an extent sufficient to build up the required oil pressure within said thrust bearings.

Other details and advantages of my invention will appear and will be readily understood from the following description, with reference to the accompanying drawing, which description and drawing are, of course, given mainly by way of example and are not to be construed as restricting the scope of the invention.

The accompanying drawing shows a longitudinal and axial cross section of one half of a planetary speed-reduction gear according to my invention.

The majority of speed-reduction gears used heretofore in connection with aircraft engines have been, in so far as concerns their general construction, of the type illustrated in the figure. These devices generally comprise a first planetary gear-wheel 1 driven by the driving shaft 2, a second planetary gear-wheel 3, which is maintained stationary by suitable interlocking means integral with the gear case 4, and a plurality of satellite gear pinions 5 revolving freely on the radial arms 6 of a star member or spider which is keyed or otherwise fixed to the driven shaft 7, which driven shaft may, for example, be the aircraft propeller shaft.

The planetary gears 1 and 3 are commonly held, axially, between two abutment flanges 8 and 9 formed integrally on respective sleeve members or collars 20 and 21, said sleeve members being secured to, and revolving with, the driven shaft 7. Axial thrust bearings are inserted between the rear abutment flange 8 and the planetary gear 1, on one hand, and between the front abutment flange 9 and the planetary gear 3 on the other hand; and radial thrust bearings 24 are further provided at the end of each arm 6 of the spider 25, in order to oppose the outward radial thrust exerted on the satellites 5.

The lubrication of said thrust bearings is effected with oil delivered under pressure, by an oil pump indicated diagrammatically at 26, into an annular chamber 27 formed inside the driven shaft 7, the oil being pumped from an oil reserve capacity indicated diagrammatically at 28, which capacity may optionally be the lower portion of the gear case 4, or be simply connected to the same.

The lubrication of the radial thrust bearings 24 is effected through an oil passage 29 communicating with the journal of the arm 6 of the spider 25, the oil escaping therefrom between the members of the thrust bearing 24.

According to common practice, the lubrication of the axial thrust bearings is effected through oil passages 10 and 11 passing through the walls of the driven shaft 7 and the sleeve members 20 and 21. The oil delivered under pressure into the oil space 27 passes through the passages 10 and 11 respectively into two annular oil-distributing spaces or chambers 12 and 13 provided on the inner edge of the rear and front thrust bearings. From said oil-distributing chambers 12 and 13, a portion of the oil passes into the corresponding thrust bearings.

It has been the practice heretofore to allow the excess of oil, over and above the amount forced into the axial thrust bearings, to escape freely from the oil chambers 12 and 13 into the gear case, where it serves to lubricate the gear teeth. However, trouble has been encountered in practical operation, owing to imperfect lubrication of said axial thrust bearings. It is the purpose of my invention to correct this defect.

I achieve this result by providing, in the return passages connecting the oil-feed chambers supplying each axial thrust bearing with the inside of the gear case 4, sections of constricted cross-sectional area offering considerable resistance to the flow of oil, and thus causing the oil pressure to increase materially in said oil-feed chambers, said oil pressure reaching, for example, such values as 25 to 40 pounds per sq. inch. In this manner, a more positive flow of oil to the thrust bearings is insured and the lubrication of said bearings is thereby greatly improved.

In accordance with one of the preferred embodiments of my invention, I follow present practice, as hereinbefore described, in so far as concerns the general design of the reduction gear; but I depart from said practice in the design of the oil return passages from the axial thrust bearings.

In accordance with previous practice, I insert between the abutment flanges 8 and 9 and the corresponding planetary gear wheels 1 and 3 thrust bearings, each comprising first an annular self-aligning member, 14 in the rear bearing and 15 in the front bearing, one face 30 of which is formed into a convex spherical segment centered on the center line of the reduction gear, and which rests against a corresponding concave spherical surface formed in the corresponding planetary gear wheel, whereas the other face 31, which is plane, bears against a friction ring, 16 in the rear bearing and 17 on the front bearing. The planetary gear wheel 1 is driven by the driving shaft 2 through the medium of a mechanical connection, such as interlocking spur and annular gearing 32, which affords a substantial degree of freedom of motion to said gear wheel 1; whereas the planetary gear wheel 3 is held stationary with respect to the gear case 4 through the medium of a similar mechanical connection 33, which also affords a certain degree of freedom of motion to the gear wheel 3. Hence the planetary gear wheels 1 and 3 are free to rotate respectively around the centers of their spherical surfaces, and therefore automatically take the correct positions according to the alignment of the driving and driven shafts.

In accordance with the known practice, the rear and front axial thrust bearings further comprise revolving friction rings, 18 in the rear bearing and 19 in the front, made, for example, of steel, faced on both their rubbing surfaces with Babbitt metal or other anti-friction material, oil grooves preferably closed at their outer ends being provided in said rubbing surfaces.

The spider 25, its two planetary gear wheels 1 and 3 and the front and rear axial thrust bearings are assembled axially by screwing sleeve member 20 onto the driven shaft 7, thus pressing the above parts between the abutment flanges 8 and 9. The friction rings 18 and 19 of each thrust bearing are bored to an inside diameter leaving sufficient clearance around the outer surface of the respective sleeve members 20 and 21 to form the annular oil-distributing spaces or chambers 12 and 13, which spaces are supplied with oil through the oil holes 10 and 11.

Instead of leaving, as heretofore, between the outer surface of sleeve members 20 and 21 and the corresponding inner faces of the planetary gear wheels 1 and 3, or of members which are integral with said planetary gear wheels, a sufficient clearance to allow the excess oil to flow freely from the oil-distributing spaces 12 and 13 into the gear case, according to my invention, I leave between said surfaces a small clearance just sufficient to throttle the oil flow and to cause the oil pressure in the chambers 12 and 13 to increase substantially, for example to about 25 to 40 pounds per sq. inch.

This result may be attained in several ways. According to one of the preferred forms of my invention, I insert between said sleeve members 20 and 21 and any convenient portion of the inner surfaces of the planetary gears 1 and 3, or of members integral with said gears, suitably shaped obstructing members, which reduce the cross-sectional area of the oil return passages to a value sufficient to build up the oil pressure in said oil-chambers 12 and 13. These obstructing members may conveniently be, for example, carefully machined collars 22 and 23 ground to accurate dimensions, which collars may be made to revolve with the driven shaft 7. By way of example, the smallest clearance between these obstructing members and their surrounding parts may be of the order of 0.05 mm.

I find it convenient to adopt the construction indicated in the accompanying drawing. Each obstructing member comprises an inner annular portion intended to be tightly assembled, together with the spider 25, the planetary gears and the axial thrust bearings, between the abutment flanges 8 and 9, by screwing the sleeve member 20 onto its threaded seat on the driven shaft 7. The outer or active portions of said obstructing members are intended to determine the allowable clearance. Said outer portion may be made of any suitable shape compatible with that of the co-acting surfaces. I prefer to make the obstructing member 22 on the rear bearing, as shown in the figure, in the shape of a flat ring, one axial face of which co-acts with a corresponding face of the self-aligning member 14, leaving an axial clearance of the order of 0.05 mm. between the two co-acting surfaces, while its outside diameter is designed to leave about 0.5 mm. radial clearance between it and the coacting inner surface of member 14.

In so far as concerns the obstructing ring member 23 on the front thrust bearing, I prefer to give it, as shown in the drawing, an angular cross-section comprising a radial and an axial portion, the radial portion being held between sleeve member 21 and the hub of spider 25, the horizontal or axial flange being ground to co-act with the inner surface of planetary gear 3, leaving a radial clearance of the order of 0.5 mm. between the two co-acting surfaces, whereas the outer edge of said axial portion of said ring is ground to coact with the inner edge of the self-aligning member 15, leaving an axial clearance of the order of 0.05 mm. between them.

By means of my invention, I provide a planetary speed reduction gear in which the lubrication of the axial thrust bearings is greatly improved.

I wish it to be understood, of course, that I do not desire to be limited to the construction shown in the drawing or described hereinbefore, for obvious modifications therein will occur to a person skilled in the art. For example, the throttling means provided in the oil discharge passages from the thrust bearings might be of any other nature or design. Also the thrust bearings which are to be lubricated might be ball or roller bearings, in which case the purpose of the obstructing means would be to cause the majority of the oil to flow through said bearings.

What I claim is:

1. A lubricating system for a planetary speed reduction gear having sun wheels and thrust bearings for supporting said wheels, an oil reservoir, an oil pump connected with said reservoir, inlet passages connecting said pump with said thrust bearings, oil outlet passages from said thrust bearings, and means for throttling the flow of oil through said outlet passages, said means forming a wide, thin channel of small cross-sectional size.

2. A lubricating system for a planetary speed reduction gear having sun wheels and thrust bearings for supporting said wheels, an oil reservoir, an oil pump connected with said reservoir, inlet passages connecting said pump with said thrust bearings, oil outlet passages from said thrust bearings, and means for throttling the flow of oil through said outlet passages, said means forming a wide, thin channel of small cross-sectional size and angular direction.

3. In a device as claimed in claim 1, said channel having the form of an annulus.

MARC BIRKIGT.